June 3, 1958   M. P. SIEDBAND   2,837,645
MAGNETIC-THYRATRON MODULATOR
Filed Aug. 24, 1955

INVENTOR
MELVIN P. SIEDBAND

BY R. J. Tompkins
ATTORNEYS

United States Patent Office 2,837,645
Patented June 3, 1958

2,837,645

MAGNETIC-THYRATRON MODULATOR

Melvin P. Siedband, Baltimore, Md., assignor, by mesne assignments, to the United States of America as represented by the Secretary of the Navy Application August 24, 1955, Serial No. 530,430

5 Claims. (Cl. 250—27)

The present invention relates to a magnetic-thyratron modulator and more particularly to a magnetic-thyratron modulator having a unique pulsing network for use with a frequency multiplier.

In radar installations a modulator is employed to control the operation of the radar transmitter. The modulator controls the shape, duration, and repetition frequency of the radar pulses and causes radio-frequency energy to be produced in short, powerful pulses. In the design of magnetic modulators it is frequently desirable to generate pulses at repetition rates other than the supply line frequency. There exist two general methods for accomplishing this: (1) The use of a source of A. C. power at the repetition frequency desired or, (2) the manipulation of a multiphase supply such that the desired frequency is extracted as a harmonic of the supply. The output pulses of the frequency multiplier that is employed in the second method are quite often biphase, of different magnitudes, and not of the shape and duration to pulse a radar transmitter tube.

The present invention relates to a combination and a device for use with a frequency multiplier or a frequency-phase converter which will add the input pulses, will convert them to a common polarity, and will sharpen and shape them so that they may properly drive a radar transmitter tube.

Accordingly, an object of the present invention is the provision of a modulator for controlling the operation of a radar transmitter tube.

Another object is to provide a modulator for causing the radio-frequency energy from a radar transmitter tube to be produced in short powerful pulses.

A further object of the invention is the provision of a magnetic-thyratron modulator for producing uni-polar output pulses having the proper shape and sharpness to properly drive a radar transmitter tube.

Still another object is to provide a device for converting the output pulses from a frequency multiplier into pulses of the same polarity and having the proper shape and sharpness to properly drive a radar transmitter tube.

Other objects and many of the attendant advantages of this invention will be readily appreciated as the same becomes better understood by reference to the following detailed description when considered in connection with the accompanying drawings wherein.

Figure 1:
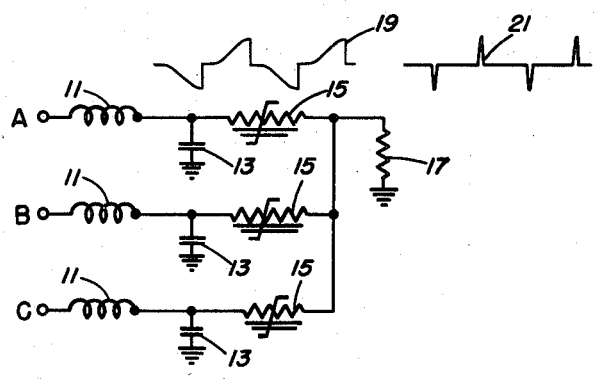
Fig. 1 shows a circuit diagram of one frequency-phase converter that can be employed in the present invention.

Referring now to the drawings, wherein like reference characters designate like or corresponding parts throughout the several views, there is shown in Fig. 1, a frequency phase converter having inputs A, B, and C from a three-phase line. Each phase contains a resonant circuit comprising inductor 11 and capacitor 13 and a series saturable core reactor 15. The outputs of all three phases are terminated in grounded resistor 17. Wave 19 is present at the terminal between inductor 11 and capacitor 13 and wave 21, which is the summation of the outputs of the three phases, appears across resistor 17 with a frequency equal to three times that of the resonant circuits and with pulses that are alternately positive and negative.

Figure 2:
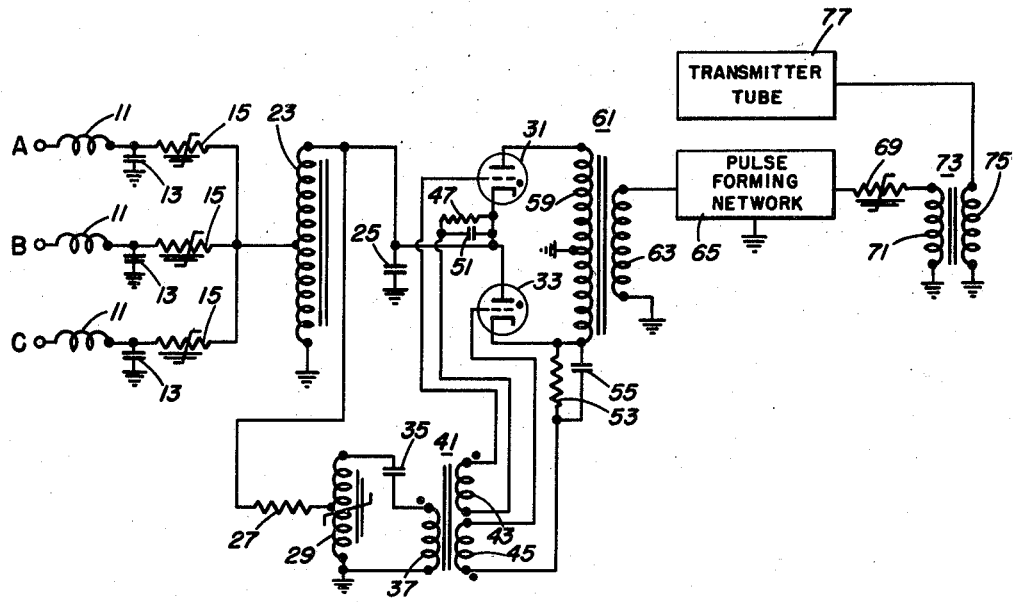
Fig. 2 illustrates a circuit diagram of a preferred embodiment of the invention as employed with the frequency-phase converter of Fig. 1.

In Fig. 2 the output of the frequency-phase converter of Fig. 1 is shown connected to the center-tap of a grounded autotransformer 23 which has its ungrounded end coupled to charging capacitor 25 and through resistor 27 to the center-tap on saturable transformer 29. Charging capacitor 25 is also connected to the terminal between the cathode of thyratron 31 and the plate of thyratron 33. Another charging capacitor 35 is joined in series with the primary 37 of transformer 41 across saturable transformer 29. Transformer 41 has two secondaries 43 and 45 which are wound in a manner such that the voltages on the ends of the windings adjacent the dots are in phase at all times. Secondary 43 has one end connected to the grid of thyratron 31 and the other end coupled through the biasing arrangement of resistor 47 and capacitor 51 to the cathode of thyratron 31. Secondary 45 is similarly joined through resistor 53 and capacitor 55 to the grid and cathode of thyratron 33. Thyratrons 31 and 33 are joined in series across the grounded-center-tap primary 59 of transformer 61. The grounded secondary 63 of transformer 61 is connected to the input of a pulse forming network 65 which may be of any suitable type; e. g., such as any of those shown on page 6–11, in Fig. 6B of Principles of Radar, Radar School, Massachusetts Institute of Technology, 1946, McGraw-Hill Book Co., New York. The output of pulse forming network 65 is coupled through a switch shown here as discharging saturable core reactor 69 but which could be of another type as for example a mechanical switch, to the primary 71 of transformer 73. The secondary 75 of transformer 73 is joined to the radar transmitter tube 77 which in many units will be a magnetron.

As previously stated, one method for generating pulses at repetition rates other than the supply line frequency is the manipulation of a multiphase supply such that the desired frequency is extracted as a harmonic of the supply. Fig. 1 illustrates an exemplary frequency-phase converter for employing this method. In this converter, resonant charged capacitors are discharged bi-phase by series saturable core reactors 15. This is done for the three phases of the supply line. The problem is to add the outputs, make the pulses of the same polarity and sharpen and shape them so that they may properly drive a radar transmitter tube, e. g. a magnetron. Unfortunately, each of the three phases of the power line may regulate differently thus producing pulses at the output of the first magnetic stage (previously described) which differ from each other. If the difference is too large, it becomes difficult to follow the first stage with additional magnetic stages of such latitudes of electrical characteristics sufficient to ensure reliable operation. The problem is to find the most economical system, reliable and small, and of such stability and design to tolerate the anomalies of the A. C. source. Fig. 2 illustrates one such system using argon or xenon low voltage thyratrons in the second stage.

In the operation of the circuit disclosed in Fig. 2, the biphase energy from the frequency phase converter is placed on capacitor 25. As the voltage builds up on capacitor 25, saturable transformer 29 charges capacitor 35. Saturable transformer 29 is arranged to saturate when the charge on capacitor 25 is at its maximum (positive or negative), thus capacitor 35 is discharged through transformer 41 firing one or the other of the two thyratrons 31 and 33 depending upon the polarity of the discharge pulse from capacitor 35. Thus, thyratrons 31 and 33 are alternately fired and due to their polarities, the discharge current from capacitor 25 always flows through primary 59 in the same direction. Hence, the voltage on the secondary 63 which is impressed upon pulse forming network 65 is unidirectional. Pulse forming network 65 in conjunction with switching saturable core reactor 69 converts the unidirectional pulses into short rectangular pulses which are coupled to the transmitter tube 77 by transformer 73.

It is to be realized that any type frequency-phase converter can be used in the present system and not merely the one shown in Fig. 1. Also, there is no limitation on the number of input phases with which the present invention is utilizable.

Obviously many modifications and variations of the present invention are possible in the light of the above teachings. It is therefore to be understood that within the scope of the appended claims the invention may be practiced otherwise than as specifically described.

What is claimed is:

1. A device for connection to a frequency multiplier, said device comprising: input terminal means for connection to the output of a frequency multiplier, charge storage means connected to said input terminals for charging by the output of said frequency multiplier, a discharge path for said charge storage means said discharge path comprising two series joined thyratrons connected across the primary of a transformer having a grounded center-tap and means coupling said thyratrons to said charge storage means, means coupled to said thyratrons for rapidly discharging said charge storage means through said discharge path when the charge on said charge storage means reaches its maximum value, a pulse forming network and switch having an input connected to the secondary of said transformer for shaping an input pulse to enable it to fire a magnetron, and output terminal means connected to the output of said pulse forming network and switch for connection to the input of a radar transmitter tube.

2. The device of claim 1 wherein said charge storage means is a capacitor.

3. The device of claim 1 wherein said means for rapidly discharging said charge storage means comprises: a capacitor connected to be charged in parallel with said charge storage means; a transformer having a primary coupled to one terminal of said capacitor and having two secondaries each of which is joined to the grid of a different one of said thyratrons; a saturable transformer joined to the unconnected terminal of said capacitor and the primary of said transformer so that the capacitor, the saturable transformer and the primary of said transformer are joined in series, said saturable transformer being arranged to saturate when the charge on said charge storage means reaches its maximum value.

4. A magnetic-thyratron modulator comprising: a frequency multiplier, an autotransformer grounded at one end and having a center-tap for connection to the output of said frequency multiplier, a first capacitor having a first plate connected to the ungrounded end of said autotransformer and having a second plate grounded, a resistor, a grounded saturable transformer having a center-tap connected through said resistor to said first plate, a second capacitor, a first transformer having a primary and two secondaries, connections for joining said second capacitor and said primary in series between the ungrounded end of said saturable transformer and ground, a second transformer having a primary and a secondary winding, a first thyratron, a second thyratron, leads for connecting the primary of said second transformer and said first and second thyratrons in series such that the cathode of said first thyratron is joined to the plate of said second thyratron, leads for coupling the first plate of said first capacitor to the cathode of said first thyratron, leads for connecting one of said two secondaries to the grid of said first thyratron so that the voltage on the grid of said first thyratron is in phase with the ungrounded end of the primary of said first transformer, leads for connecting the other of said two secondaries to the grid of said second thyratron in a manner such that the voltage on the grid of said second thyratron is out of phase with the voltage on the ungrounded end of the primary of said first transformer, a pulse forming network, leads for connecting the secondary of said second transformer to the input of said pulse forming network, output terminals for connection to the input to a magnetron, and a saturable core reactor joined between the output of said pulse forming network and said output terminals for discharging said pulse forming network to produce a magnetron input pulse at said output terminals.

5. A modulator comprising; a frequency-phase converter for connection to a multiphase energy source for converting the multiphase energy to single-phase energy having a higher frequency than that of said source, charge storage means connected to the output of said frequency-phase converter for charging up to the peak of the converter output, a discharge path for said charge storage means said discharge path comprising two series joined thyratrons connected across the primary of a transformer having a grounded center-tap and means coupling said thyratrons to said charge storage means, means coupled to said thyratrons for rapidly discharging said charge storage means through said discharge path when the charge on said charge storage means attains its maximum value, a pulse forming and discharging switch means coupled to the secondary of said transformer for converting the discharge pulse through said discharge path into a short rectangular pulse of proper shape and size for controlling the operation of a radar transmitter, and output terminals connected for joining the output of said pulse forming network and discharging switch means to the input of a radar transmitting tube.

References Cited in the file of this patent

UNITED STATES PATENTS

| | | |
|---|---|---|
| 2,428,926 | Bliss | Oct. 14, 1947 |
| 2,493,762 | Klemperer | Jan. 10, 1950 |
| 2,533,285 | Sager | Dec. 12, 1950 |
| 2,595,301 | Sager | May 6, 1952 |